US012559034B2

(12) United States Patent
Wang et al.

(10) Patent No.: US 12,559,034 B2
(45) Date of Patent: Feb. 24, 2026

(54) METHODS FOR DEPLOYING POWER RUNNING BOARDS ON VEHICLES

(71) Applicant: Toyota Motor Engineering & Manufacturing North America, Inc., Plano, TX (US)

(72) Inventors: Timothy Wang, Ann Arbor, MI (US); Roger Akira Kyle, Aubrey, TX (US); Bryan Else Yamasaki, Frisco, TX (US); Justin K Shen, Canton, MI (US); Jackson Zhu, Belleville, MI (US); Sean Xu, Novi, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 289 days.

(21) Appl. No.: 18/327,188

(22) Filed: Jun. 1, 2023

(65) Prior Publication Data

US 2024/0399962 A1 Dec. 5, 2024

(51) Int. Cl.
B60R 3/00 (2006.01)
B60R 3/02 (2006.01)

(52) U.S. Cl.
CPC ................ B60R 3/002 (2013.01); B60R 3/02 (2013.01)

(58) Field of Classification Search
CPC .................................. B60R 3/002; B60R 3/02
See application file for complete search history.

(56) References Cited

U.S. PATENT DOCUMENTS

| | | | | |
|---|---|---|---|---|
| 9,802,545 | B1 * | 10/2017 | Salter ...................... | B60R 3/002 |
| 9,975,490 | B1 * | 5/2018 | Ozog ........................ | B60R 3/02 |
| 10,144,345 | B2 | 12/2018 | Stinson et al. | |
| 10,220,704 | B2 | 3/2019 | Machak et al. | |
| 10,336,260 | B1 * | 7/2019 | Salter ........................ | B60R 3/02 |
| 10,913,397 | B2 | 2/2021 | Pribisic | |
| 11,781,369 | B2 * | 10/2023 | Salter ...................... | E05F 15/75 |
| | | | | 49/31 |
| 2008/0061566 | A1 * | 3/2008 | Ryan ........................ | B60R 19/38 |
| | | | | 293/118 |
| 2008/0122209 | A1 * | 5/2008 | Jayasuriya ............. | B62D 49/08 |
| | | | | 280/755 |
| 2008/0122258 | A1 * | 5/2008 | Jayasuriya .............. | B60R 21/00 |
| | | | | 296/187.12 |
| 2015/0123374 | A1 * | 5/2015 | Smith ...................... | B60R 3/002 |
| | | | | 280/166 |
| 2016/0339844 | A1 * | 11/2016 | Pribisic .................... | B60R 3/02 |

(Continued)

FOREIGN PATENT DOCUMENTS

| | | |
|---|---|---|
| CN | 110154905 A | 8/2019 |
| KR | 101535027 B1 | 7/2015 |
| KR | 102009858 B1 | 8/2019 |

*Primary Examiner* — Long T Tran
(74) *Attorney, Agent, or Firm* — Dinsmore & Shohl LLP

(57) ABSTRACT

A method for a deployable power running board of a vehicle is provided. The method includes receiving sensor data from the vehicle, the sensor data indicating a distance between the power running board and an object, an approaching angle of the object approaching the power running board, and/or a vehicle position status, calculating a distance and/or speed of deployment or retraction of the power running board based on the sensor data, and deploying or retracting the power running board based on the calculated distance and/or speed of deployment or retraction.

9 Claims, 3 Drawing Sheets

(56)     References Cited

U.S. PATENT DOCUMENTS

| 2018/0134221 | A1* | 5/2018 | Burton | ....................... | B60R 3/02 |
|---|---|---|---|---|---|
| 2018/0314269 | A1* | 11/2018 | Dudar | ....................... | B60R 3/02 |
| 2020/0062183 | A1* | 2/2020 | Smith | ....................... | G05D 3/10 |
| 2023/0103458 | A1* | 4/2023 | Williams | ................ | B60R 3/002 |
| | | | | | 701/49 |
| 2023/0256909 | A1* | 8/2023 | Salter | ....................... | B60R 3/02 |
| | | | | | 280/166 |
| 2023/0294608 | A1* | 9/2023 | Gaither | .................... | B60R 3/02 |
| | | | | | 280/166 |

* cited by examiner

METHODS FOR DEPLOYING POWER RUNNING BOARDS ON VEHICLES

TECHNICAL FIELD

The present disclosure relates to power running boards on vehicles, and more particularly, to methods for operating power running boards.

BACKGROUND

A power running board is a motorized running board that extends or retracts for the purposes of temporarily providing a step for entering a cabin of a vehicle. For example, the power running board may be stowed when not in use or deployed when a step is needed. Other uses of the power running boards have not been explored.

SUMMARY

In accordance with one aspect of the present disclosure, a method for a deployable power running board of a vehicle includes receiving sensor data from the vehicle, the sensor data indicating a distance between the power running board and an object, an approaching angle of the object approaching the power running board, and/or a vehicle position status, calculating a distance and/or speed of deployment or retraction of the power running board based on the sensor data, and deploying or retracting the power running board based on the calculated distance and/or speed of deployment or retraction.

Although the concepts of the present disclosure are described herein with primary reference to user-driven automobiles, it is contemplated that the concepts will enjoy applicability to any vehicle, user-driven or autonomous. For example, and not by way of limitation, it is contemplated that the concepts of the present disclosure will enjoy applicability to autonomous automobiles.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods for deployable power running boards of vehicles. In embodiments disclosed herein, a vehicle may have a power running board which is deployable and retractable. Generally, the power running board may be deployed when in use and retracted when not in use. The power running board may be operated based on sensor data. The sensor data indicates a distance between the power running board and an object, an approaching angle of the object approaching the power running board, and/or a vehicle position status. Based on the sensor data, a distance and/or speed of deployment or retraction of the power running board may be adjusted for various purposes. The embodiments disclosed herein are particularly helpful for avoiding contact with the object when the object is falling toward the power running board, obstructing the vehicle from spinning or rolling during a rollover event, deterring a potential vehicle theft by deploying the power running board in full speed and distance, and/or the like. The embodiments disclosed herein may be used with additional features for various usage cases of the power running board.

Figure 1:
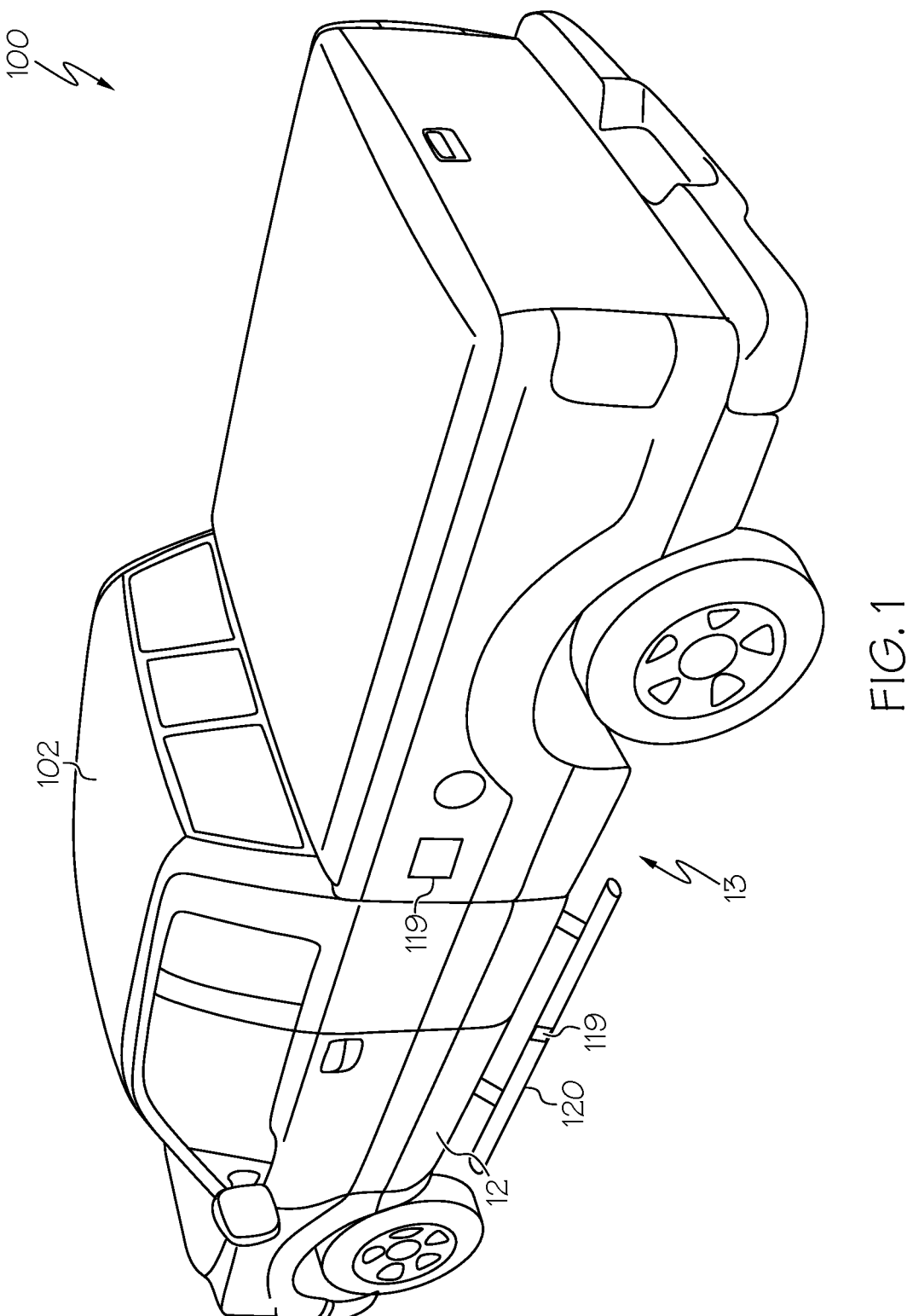
FIG. 1 depicts a perspective view of a vehicle with a power running board, according to one or more embodiments shown and described herein.

FIG. 1 depicts a system 100 including a vehicle 102 with a power running board 120, according to one or more embodiments shown and described herewith. The vehicle 102 may include an automobile or any other passenger vehicle such as, for example, a terrestrial, aquatic, and/or airborne vehicle. In some embodiments, the vehicle 102 may be an autonomous aerial vehicle capable of transporting passengers. The vehicle 102 may be an autonomous and connected vehicle that navigates its environment with limited human input or without human input. The vehicle 102 may be equipped with internet access and share data with other devices both inside and outside the vehicle 102.

The power running board 120 is deployable and/or retractable. In embodiments, the power running board 120 is movable between a deployed position and a retracted position. For example, the power running board 120 may be rotatable or slidable with respect to the vehicle 102. In FIG. 1, the power running board 120 is in the deployed position. In the retracted position, the power running board 120 may be rotated toward a door 12 of the vehicle 102 (e.g., folded up toward the door 12) or may be rotated toward an underside 13 of the vehicle 102 (e.g., folded down toward the ground or the underside 13 of the vehicle 102). In the retracted position, the power running board 120 may be slid toward the vehicle 102 such that a distance between the power running board 120 and the vehicle 102 is reduced. The power running board 120 may be slid into an opening in the vehicle 102 or underside 13 of the vehicle 102. The power running board 120 may be disposed on a passenger side of the vehicle 102 or a driver side of the vehicle 102 or both. A user may step on the power running board 120 when the power running board 120 is in the deployed position. For example, the power running board 120 may be substantially horizontal. For example, the power running board may include a motor operable to rotate the power running board 120 in the deployed position and the retracted position. In another example, the motor may be operably coupled to a linear actuator, which converts rotary input to linear motion to slide the power running board 120 in the deployed position and the retracted position. In some embodiments, pyrotechnics may be used to operate the power running board 120 to increase the speed of deployment or retraction of the power running board 120 relative to a motor or actuator.

The vehicle 102 may include one or more sensors 119 for sensing an object (e.g., humans, animals, other vehicles, or the like) in the vicinity of the vehicle 102 or the power running board 120. The sensors 119 may be disposed inside or outside a cabin or engine compartment of the vehicle 102 (depicted as outside in FIG. 1). In embodiments, the sensors 119 may provide sensor data including a distance between the power running board and the object, an approaching angle and/or speed of the object approaching the power running board 120, and/or a vehicle position status (e.g., a position with respect to a ground position of the vehicle indicating a proximity of the vehicle to ground or an angle of the vehicle with respect to the ground). The position of the power running board 120 (e.g., a distance or an angle of the power running board 120 relative to the vehicle 102) may be adjusted relative to the vehicle 102 based on the sensor data.

Figure 2:
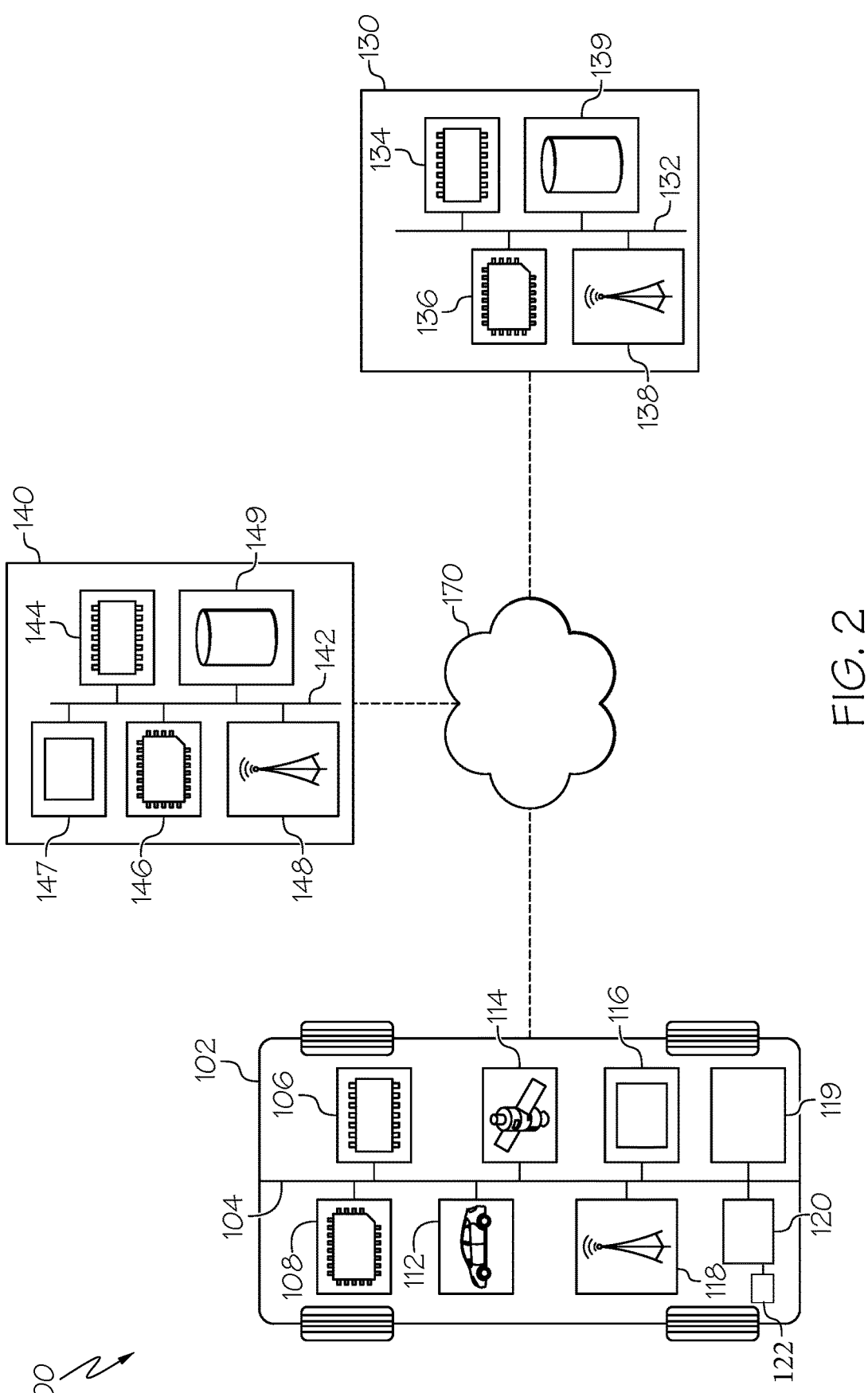
FIG. 2 depicts a schematic diagram of a system including the vehicle of FIG. 1, according to one or more embodiments shown and described herein.

Referring to FIG. 2, a schematic diagram of the system 100 is depicted. The system 100 may include the vehicle 102, a server 130, a personal device 140, and a network 170. While FIG. 2 depicts a single vehicle and a single personal device, the system 100 may communicate with a plurality of vehicles and a plurality of personal devices.

The vehicle 102 may include a processor 108, a memory 106, a driving assist module 112, a network interface 118, a location module 114, an user interface 116, the sensors 119, and the power running board 120. The vehicle 102 also may include a communication path 104 that communicatively connects the various components of the vehicle 102. The power running board 120 may include a deployment/retraction mechanism 122, for example, a motor, a linear actuator, a pyrotechnics mechanism (e.g., a chamber with explosive material, or the like), or the like.

The processor 108 may include one or more processors that may be any device capable of executing machine-readable and executable instructions. Accordingly, each of the one or more processors of the processor 108 may be a controller, an integrated circuit, a microchip, or any other computing device. The processor 108 is coupled to the communication path 104 that provides signal connectivity between the various components of the connected vehicle. Accordingly, the communication path 104 may communicatively couple any number of processors of the processor 108 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 includes a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 106 is coupled to the communication path 104 and may contain one or more memory modules comprising RAM, ROM, flash memories, hard drives, or any device capable of storing machine-readable and executable instructions such that the machine-readable and executable instructions can be accessed by the processor 108. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The vehicle 102 may also include the driving assist module 112. The driving assist module 112 is coupled to the communication path 104 and communicatively coupled to the processor 108. The driving assist module 112 may include sensors such as LiDAR sensors, RADAR sensors, optical sensors (e.g., cameras), laser sensors, proximity sensors, location sensors (e.g., GPS modules), and the like. Sensor data gathered by the sensors may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, autonomous driving, and/or the like.

In embodiments, the sensors of the driving assist module 112 may sense an object in the vicinity of the vehicle 102 or the power running board 120. In embodiments, the senor data from the sensors of the driving assist module 112 may include a distance between the power running board and the object, an approaching angle and/or speed of the object approaching the power running board 120, and/or a vehicle position status (e.g., a position with respect to a ground position of the vehicle indicating a proximity of the vehicle to ground or an angle of the vehicle with respect to the ground). The position of the power running board 120 (e.g., a distance or an angle of the power running board 120) may be adjusted relative to the vehicle 102 based on the sensor data.

The vehicle 102 also comprises the network interface 118 that includes hardware for communicatively coupling the vehicle 102 to the server 130. The network interface 118 can be communicatively coupled to the communication path 104 and can be any device capable of transmitting and/or receiving data via a network or other communication mechanisms. Accordingly, the network interface 118 can include a communication transceiver for sending and/or receiving any wired or wireless communication. For example, the hardware of the network interface 118 may include an antenna, a modem, a LAN port, a Wi-Fi card, a WiMAX card, a cellular modem, near-field communication hardware, satellite communication hardware, and/or any other wired or wireless hardware for communicating with other networks and/or devices. The vehicle 102 may connect with one or more other connected vehicles and/or external processing devices (e.g., the server 130) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

The location module 114 is coupled to the communication path 104 such that the communication path 104 communicatively couples the location module 114 to other modules of the vehicle 102. The location module 114 may include one or more antennas configured to receive signals from global positioning system (GPS) satellites. Specifically, in one embodiment, the location module 114 includes one or more conductive elements that interact with electromagnetic signals transmitted by GPS satellites. The received signal is transformed into a data signal indicative of the location (e.g., latitude and longitude) of the location module 114, and consequently, the vehicle 102. In embodiments, the location signal may be used to determine that the vehicle 102 is in a high crime area. When the vehicle 102 is determined to be in a high crime area based on the location signal, an unauthorized attempt to open the door 12 may trigger deploying the power running board 120 in full speed and distance. When the vehicle 102 is determined to be in a high crime area based on the location signal, a potential vehicle theft may be determined with a degree of certainty lower than when the vehicle 102 is determined to be in a low crime area (e.g., not in a high crime area).

The vehicle 102 may include the user interface 116 that may include a display is disposed internal and/or external to the vehicle 102. The display may display information that the vehicle 102 received from the server 130, the personal device 140, or various components coupled to the communication path 104 and the network 170. The display may display the status of the vehicle including the position of the vehicle 102, the position of the power running board 120, or the like. The user interface 116 may further include speakers to present audio information, and a touch screen that may be used by the user to input information.

As described above in conjunction with FIG. 1, the sensors 119 may sense an object in the vicinity of the vehicle 102 or the power running board 120. The sensors 119 may be coupled to the communication path 104 such that the communication path 104 communicatively couples the sensors 119 to other modules of the vehicle 102, the network 170, the server 130, and the personal device 140.

In embodiments, the vehicle 102 may be communicatively coupled to the server 130 and the personal device 140 by the network 170 via the network interface 118. The network 170 may be a wide area network, a local area network, a personal area network, a cellular network, a satellite network, and the like. In embodiments, the server 130 may receive the sensor data and analyze the sensor data for calculating a distance and/or speed of deployment or retraction of the power running board 120. The server 130 may perform any data processing that may be performed by the vehicle 102.

The server 130 may include a processor 136, a memory component 134, a network interface 138, a data storage 139, and a communication path 132. Each server 130 component is similar in features to its connected vehicle counterpart, described in detail above.

The personal device 140 may be a device of a user. The personal device 140 may include, without limitation, a personal computer, a smartphone, a tablet, a personal media player, or any other electric device that includes communication functionality. The personal device 140 may include a processor 146, a memory component 144, a network interface 148, a data storage 149, a user interface 147, and a communication path 142. Each component of the personal device 140 is similar in features to its connected vehicle counterpart, described in detail above. In embodiments, an object may carry the personal device 140. The sensor data may receive positional information from the personal device 140 associated with an object. The sensors 119 of the vehicle 102 may detect the personal device 140 to determine a distance between the power running board 120 and the object (e.g., the personal device 140) and/or an approaching angle of the object (e.g., the personal device 140) approaching the power running board 120.

It should be understood that the components illustrated in FIG. 2 are merely illustrative and are not intended to limit the scope of this disclosure. More specifically, while the components in FIG. 2 are illustrated as residing within vehicle 102, this is a non-limiting example. In some embodiments, one or more of the components may reside external to the vehicle 102, such as with the server 130.

Figure 3:
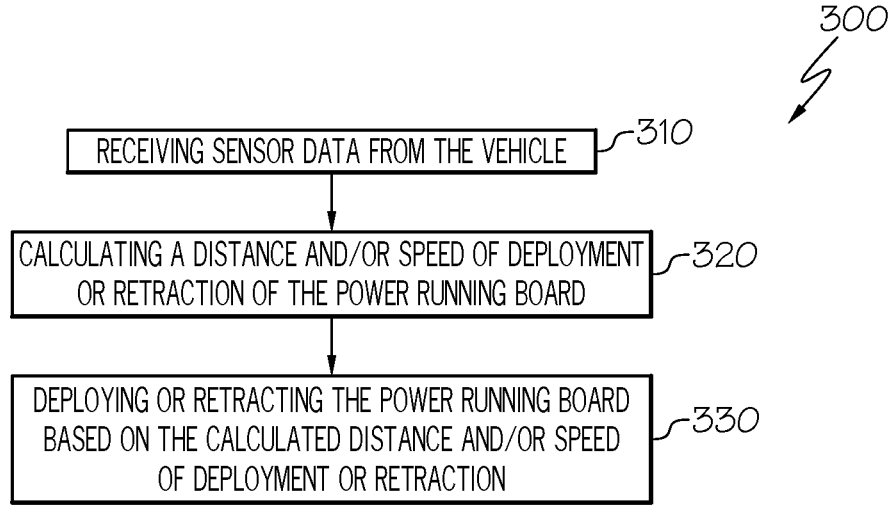
FIG. 3 depicts a flowchart of a method that may be performed by the vehicle and/or a server of FIG. 2, according to one or more embodiments shown and described herein.

Referring now to FIG. 3, a flowchart of a method 300 that performed by the vehicle 102 and/or server 130 of FIGS. 1 and 2 is depicted. At step 310, the sensor data is received from the vehicle 102. The sensor data may be received from the sensors 119, the sensors of the driving assist module 112, or the like. The sensor data may be combination of various sensor data from one or more sensors (e.g., sensors 119, the sensor of the driving assist module 112, the personal device 140, or the like). The sensor data indicates a distance between the power running board 120 and an object, an approaching angel of the object approaching the power running board 120, and/or a vehicle position status. The vehicle position status may include a position of the vehicle 102 with respect to a ground position of the vehicle 102 indicating a proximity of the vehicle to ground or an angle of the vehicle with respect to the ground. The vehicle position status may also include pitching or rolling motion of the vehicle 102.

The distance between the power running board 120 and the object may be determined based on the sensor data. For example, the sensor data may include images including the power running board 120 and the object such that the images may be analyzed to determine the distance between the power running board 120 and an object, the approaching angel of the object approaching the power running board 120, and/or the vehicle position status. For another example, the sensor data may include a result of sensing a reflected signal (e.g., laser, infrared, light, ultrasonic waves, or the like) bounced off from the object. The sensor data may include intensity of the reflected signal. For another example, the sensor data may include measurements of position status (e.g., orientation) of the vehicle 102 or the power running board 120. The position status of the vehicle 102 may be measured from various components of the vehicle 102 (e.g., components of a steering system, braking system, or the like). The position status of the power running board 120 may be measure from various components of the power running board 120 (e.g., the sensor 119 disposed on the power running board 120, or the like).

At step 320, a distance and/or speed of deployment or retraction of the power running board 120 is calculated based on the sensor data. In embodiments, the distance and/or speed of deployment or retraction of the power running board 120 is calculated. For example, the object approaches the vehicle 102 from a certain distance, at a certain speed, and from a certain angle. The distance and/or speed of deployment or retraction of the power running board 120 may be calculated based on the sensor data. In embodiments, a time when the object is expected to contact the power running board 120 may be determined based on the sensor data. The distance and/or speed of deployment or retraction of the power running board 120 may be calculated based on the time determined. The distance and/or speed of deployment or retraction of the power running board 120 may be calculated to avoid contact (e.g., collision, hitting, or the like) with the object.

At step 330, the power running board 120 is deployed or retracted based on the calculated distance and/or speed of deployment or retraction. For example, a signal may be sent to the deployment/retraction mechanism 122 to actuate the motor, the linear actuator, the pyrotechnics mechanism to deploy or retract the power running board 120. For example, when in a situation that require the power running board 120 to be quickly deployed or retracted, the pyrotechnics mechanism may be used instead of the motor and/or the linear actuator.

In embodiments, a rollover event may be determined based on the vehicle position status of the sensor data. As described above, the vehicle position status may indicate a position or an orientation of the vehicle 102. For example, the position status of the vehicle 102 may indicate a proximity of the vehicle 102 to the ground. The position status of the vehicle 102 may indicate an angle of the vehicle 102 with respect to the ground or a reference line associated with the vehicle 102 or the object (e.g., a center line, a base line, or the like of the vehicle 102 or the object) or to the object. The rollover event may include a rollover or overturn of the vehicle 102, which may involve the vehicle 102 tips or flips over onto its side (e.g., front, rear, or lateral sides) or roof. The rollover event may also include bouncing or swerving that may trigger the rollover or overturn of the vehicle 102. The distance and/or speed of deployment of the power running board may be calculated based on the determined rollover event. Specifically, when to deploy the power running board 120 is calculated based on the rollover event to obstruct the vehicle 102 from spinning or rolling during the rollover event. The power running board 120 may be deployed such that to apply force in a direction opposite to a direction of rollover. For example, the power running board 120 may be deployed to contact or hit the ground or the object (e.g., curves, other vehicles, or the like) to apply force to the vehicle 102 which may change the position status of the vehicle 102. For example, the pyrotechnics mechanism may be used to quickly deploy the power running board 120.

In embodiments, a potential vehicle theft may be detected base on the sensor data. The sensor data may include images of a suspect approaching the vehicle 102 acting suspicious. For example, the sensor data may indicate that a suspect is approaching the vehicle 102 and an unauthorized attempt to open the door 12 may be detected based on the sensor data.

The power running board 120 may be deployed in full speed and distance when the potential vehicle theft is detected. The power running board 120 deployed in full speed and distance may contact (e.g., hit, push, or the like) the suspect or the sudden movement of the power running board 120 may deter the potential vehicle theft by surprising the suspect as warning. For example, the pyrotechnics mechanism may be used to quickly deploy the power running board 120 to warn the suspect or hit the suspect.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for a deployable power running board of a vehicle, the method comprising:

receiving sensor data from the vehicle, the sensor data indicating a distance between the power running board and an object, an approaching angle of the object approaching the power running board, and/or a vehicle position status;

and transmitting a signal to a pyrotechnics mechanism at the power running board to cause the power running board to deploy or retract at a calculated distance and speed of deployment or retraction.

2. The method of claim 1, further comprising:

determining a time when the object is expected to contact the power running board based on the sensor data.

3. The method of claim 2, wherein the calculated distance and the speed of deployment or retraction of the power running board is based on the time determined.

4. The method of claim 3, wherein the calculated distance and the speed of deployment or retracting of the power running board is such to avoid contact between the object and the power running board.

5. The method of claim 1, further comprising:

determining a rollover event based on the vehicle position status of the sensor data.

6. The method of claim 5, wherein the calculated distance and the speed of deployment of the power running board is based on the determined rollover event.

7. The method of claim 6, further comprising:

calculating when to deploy the power running board based on the determined rollover event to obstruct the vehicle from spinning or rolling during the rollover event.

8. The method of claim 7, wherein the power running board is deployed to apply force in a direction opposite to a direction of rollover.

9. The method of claim 1, further comprising:

detecting a potential vehicle theft based on the sensor data; and deploying the power running board at a full speed and a maximum distance when the potential vehicle theft is detected.

\* \* \* \* \*